United States Patent
Morse

[15] 3,663,003
[45] May 16, 1972

[54] MILLING VISE

[72] Inventor: Glenn B. Morse, 321 Fountain Street, N.E., Apt. 1, Grand Rapids, Mich. 49503

[22] Filed: July 17, 1969

[21] Appl. No.: 842,676

Related U.S. Application Data

[63] Continuation-in-part of Ser. No. 618,216, Feb. 23, 1967, Pat. No. 3,470,789.

[52] U.S. Cl. ................................269/60, 269/242, 269/277
[51] Int. Cl. .........................................B23q 3/18, B25b 5/16
[58] Field of Search...................269/60, 242, 277, 264, 284, 269/262, 278, 282

[56] References Cited

UNITED STATES PATENTS

| | | | |
|---|---|---|---|
| 1,136,853 | 4/1915 | Walters | 269/277 |
| 1,216,660 | 2/1917 | Paschall | 269/60 |
| 1,239,620 | 9/1917 | Plotnik | 269/242 X |
| 1,371,617 | 3/1921 | Germanov | 269/262 X |
| 2,341,619 | 2/1944 | Huss | 269/60 |
| 2,441,379 | 5/1948 | Zimmermann | 269/282 X |

*Primary Examiner*—Gil Weidenfeld
*Attorney*—Glenn B. Morse

[57] ABSTRACT

This milling device has a clamping screw engaging a pair of jaws mounted for sliding movement along a guideway. An adjusting screw engages one of the jaws rotatively in restrained axial relationship, and also engages a base in the same manner (at least one of these being in threaded engagement). The adjusting screw is rotatably and axially free with respect to the other jaw member.

10 Claims, 10 Drawing Figures

3,663,003
SHEET 1 OF 3
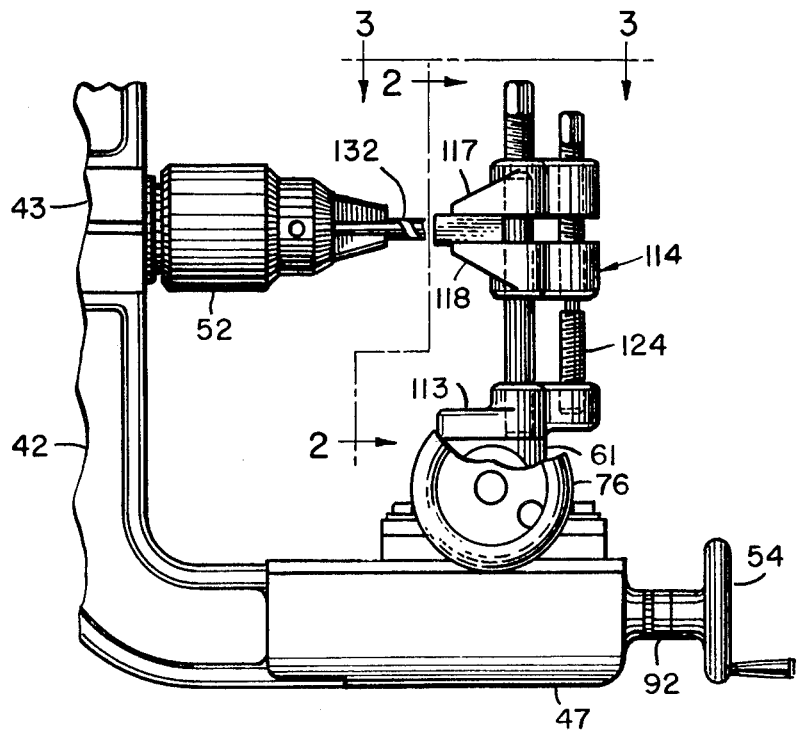
Fig. 1
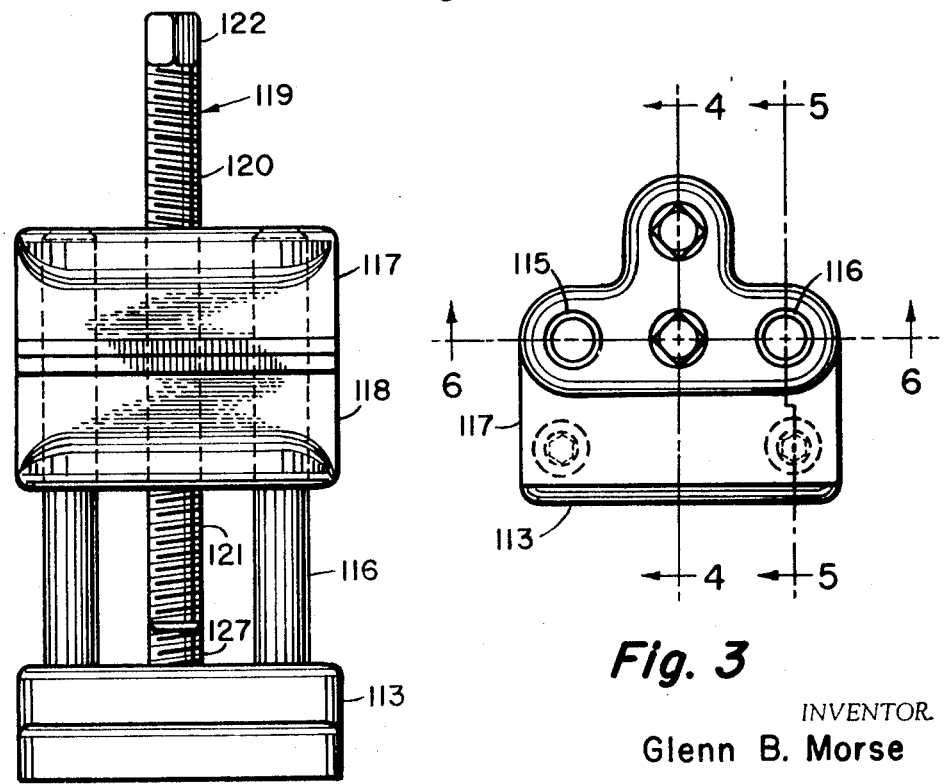
Fig. 2
Fig. 3
INVENTOR.
Glenn B. Morse INVENTOR
Glenn B. Morse

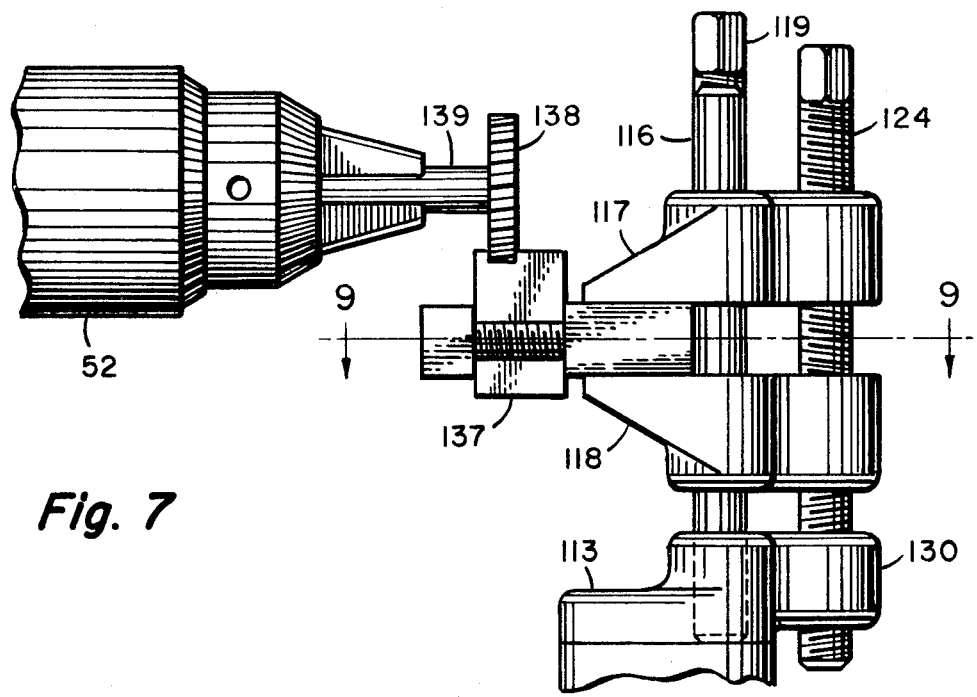
Fig. 7
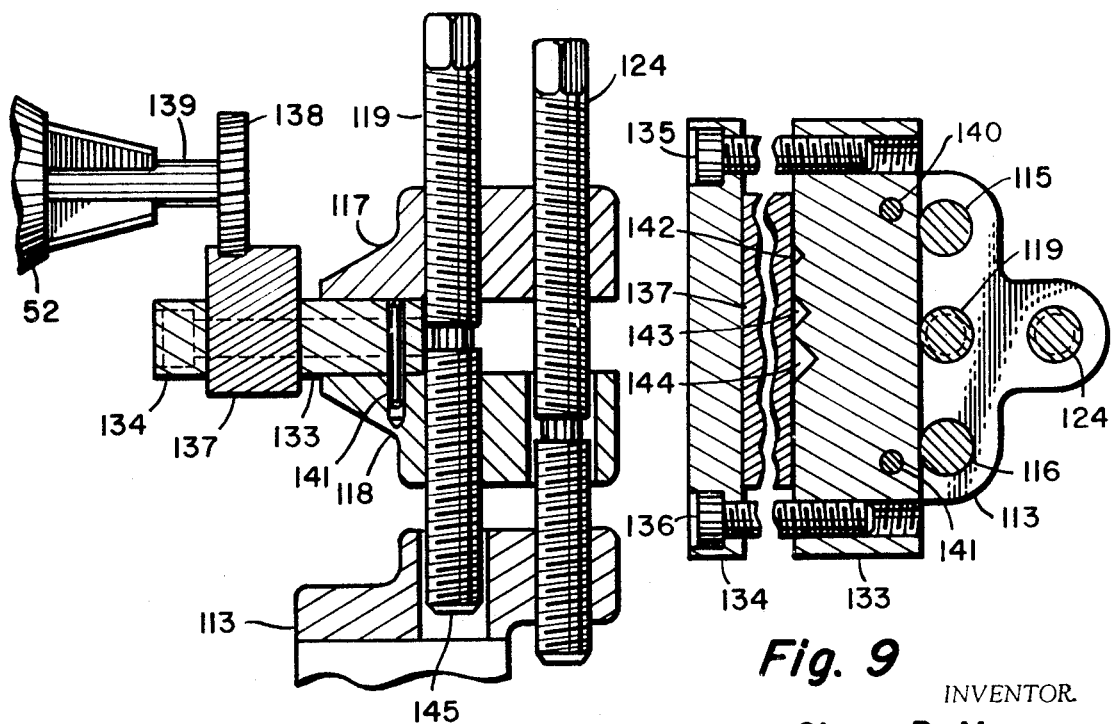
Fig. 8
Fig. 9
INVENTOR.
Glenn B. Morse

MILLING VISE

CROSS-REFERENCE

This application is a continuation in part of my application Ser. No. 618,216, filed on Feb. 23, 1967, which has now become U.S. Pat. No. 3,470,789.

BACKGROUND OF THE INVENTION

A so-called "milling vise" is an attachment commonly used to increase the utility of the endless variety of machines having rotative spindles equipped with chucks or collets for holding rotary cutting tools or work pieces. A lathe, for example, can be converted to a milling machine by replacing the tool post assembly of the lathe with a milling vise. The chuck of the lathe may be used to hold a drill or milling cutter, with the work piece held in the milling vise. The normal carriage travel of the lathe will produce movement parallel to the axis rotation of the spindle, and the milling device is intended primarily to produce adjustability of the position of the work piece in cross directions in a plane transverse to the spindle axis. Most milling devices include jaws capable of clamping the work piece securely, and some form of guideway permitting movement of the jaws (with the work piece clamped) to establish one direction of adjustability of the work piece. When the milling device is used with a lathe, the usual arrangement is to provide the milling device with a vertical guideway, so that the transverse movement of the horizontal direction is provided by the cross-slide of the lathe.

SUMMARY OF THE INVENTION

The primary objective of the present invention is economy of construction, rather than the provision of new general functions, in the broad sense. A pair of jaws are mounted for movement along a guideway preferably defined by a pair of parallel rods secured to a base member. The jaws are interconnected by a clamping screw, which is preferably in threaded engagement with both jaws; and if so, with opposite hand, respectively. The jaws have the usual gripping portions which come together on a plane of separation, and an adjusting screw is disposed parallel to the clamping screw and guideway at a position on the opposite side of the guideway from the gripping portion of the jaws. The clamping screw engages one of the jaws with axial restraint, and is axially free with respect to the other jaw. The clamping screw also engages the base, so that relative rotation will induce movement of the clamping jaws together along the guideway. In a modification of the invention, the jaws are cut away to accommodate the presence of a balancing nut in threaded engagement with the adjusting screw, and bearing on the clamping jaw in which the adjusting screw does not have threaded engagement. This clamping nut can be tightened to balance the tendency of the pressures on the clamping jaws to rotate the jaws against the guideways, and thus interfere with the freedom of movement along the guideway. An adapter is also provided by the invention for providing a 90° shift in the plane of gripping so that work pieces can be held in any position in which it is desired to perform the usual cutting actions. This adapter is held by the primary vise structure, and is of utmost simplicity.

DESCRIPTION OF THE DRAWINGS

The several features of the invention will be discussed in detail through a description of the modifications illustrated in the accompanying drawings, in which:

FIG. 1 is a side elevation showing a milling vise mounted on the carrier of a machine component of the type shown in FIG. 1, in place of the tool post.

FIG. 2 is a front elevation, on an enlarged scale, of the milling vise shown in FIG. 1.

FIG. 3 is a view on the plane 3—3 of FIG. 1.

FIG. 7 shows the use of an attachment for the milling vise illustrated in FIGS. 4–6 to convert the position of the clamping action.

FIG. 8 is a sectional side elevation through the device illustrated in FIG. 7.

FIG. 9 is a section on the plane 9—9 of FIG. 7.

DESCRIPTION OF THE PREFERRED EMBODIMENTS

Figure 4:
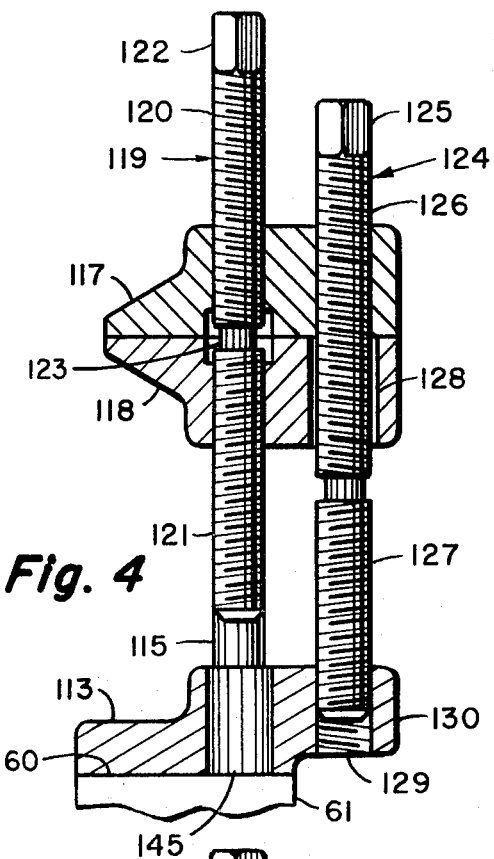
FIG. 4 is a section on an enlarged scale on the plane 4—4 of FIG. 3.
Figure 5:
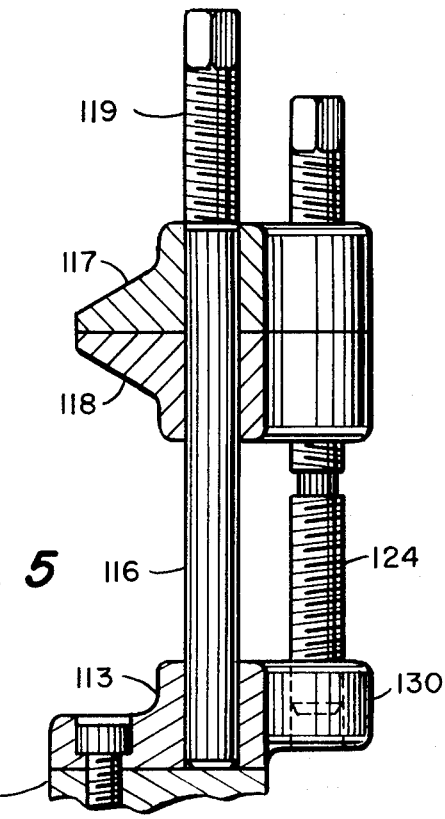
FIG. 5 is a section on the plane 5—5 of FIG. 3.
Figure 6:
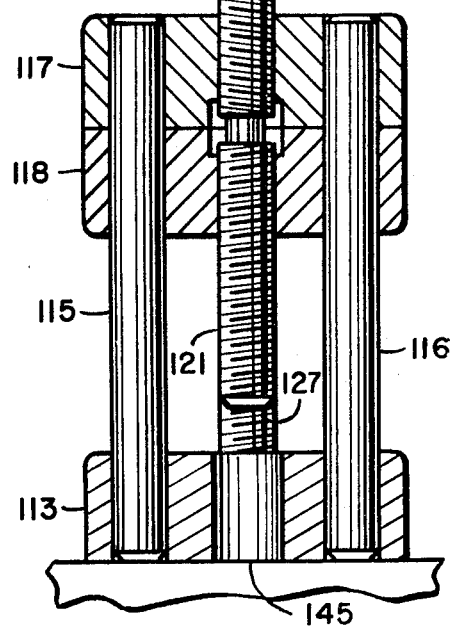
FIG. 6 is a section on the plane 6—6 of FIG. 3.

A milling vise embodying the present invention is intended primarily for use in conjunction with relatively light-duty equipment, where cost is a primary consideration. The form of the unit illustrated in the drawings was developed in conjunction with the attachment described and claimed in my application for United States Patent, Ser. No. 618,216. FIG. 1 shows the vise assembly 114 in conjunction with a lathe attachment 42 having a clamping portion 43 secured to the quill assembly of a drill press (not shown). The chuck 52 of the drill press is used for holding a drill or milling cutter 132. When the assembly is used for milling operations, it is often preferable to use a standard type of chuck 52 that has a holding collar securing the chuck with respect to the conventional taper at the end of the spindle. Side forces encountered in the milling operation, in conjunction with inevitable vibration, make this form of chuck preferable in cases involving maximum utilization of the machine. The machine is in no sense restricted to the use of a chuck with a holding collar, but requires somewhat more care in handling. With the arrangement illustrated in FIG. 1, the handle 54 controls the left-right movement of the work piece, as viewed in FIG. 1, with an indication on the ring 92 with respect to the extent of this motion. Transverse movement in a horizontal direction is controlled by the handle 76, which positions the carriage member 61.

The base 113 of the vise assembly 114 is secured to the top surface 60 of the carriage member 61 by bolts disposed in the same location as the bolts that would secure the tool post. The guide rods 115 and 116 are fixed with respect to the base 113, normally by a press-fit. The upper and lower jaw members 117 and 118, respectively, are slideably mounted on the rods 115 and 116. The clamping screw 119 has the upper end 120 threaded in opposite hand to the threading of the lower portion 121. A squared top 122 provides for the engagement of a suitable wrench to manipulate the screw 119. Preferably, the upper and lower threaded portions are separated by a portion 123 of reduced diameter to avoid interference or distortion of the threads, and to facilitate a rolled thread operation. Rotation of the screw 119 will therefore move the jaws 117 and 118 either apart or together, depending upon the direction of rotation.

The screw 119 will move with the jaws as the jaw assembly is adjusted as a unit by the screw 124, which is responsible for the vertical placement of the jaws. The screw 124 also has a squared head 125 for receiving a wrench, and has upper and lower threaded portions 126 and 127 of opposite hand. The portion 126 is in threaded engagement with the upper jaw 117, but moves within a clearance hole 128 in the lower jaw 118. The lower threaded portion 127, however, is in threaded engagement with the hole 129 in the overhanging portion 130 that extends beyond the top surface 60 of the carriage member 61. A piece of material may be clamped in the jaws 117 and 118 by manipulation of the screw 119, and then the entire unit may be adjusted vertically by manipulating the screw 124. The overhang of the portion 130 permits the screw 124 to move downward past the carriage member 61 as the unit is lowered. A piece of material held between the jaws 117 and 118 may therefore be brought into operating engagement with the milling cutter 132 held in the chuck 52. The vertical feed or adjustment will be accomplished by the screw 124, the transverse movement will be controlled by the wheel 76, and the axial movement (with respect to the milling cutter 132) will be controlled by the hand wheel 54.

It often becomes desirable to use a wheel-type cutter such as a slotting saw or abrasive drum, and it is usually desirable to change the orientation of the clamping action for such operation. FIGS. 7, 8 and 9 show an arrangement for accomplishing this. The block 133 is placed between the jaws 117 and 118 and the space between the block 133 and the bar 134 is disposed beyond the ends of the jaws 117 and 118. Tightening the bolts 135 and 136 will clamp a work piece 137 in a position where it can be conveniently brought into engagement with the cutting saw 138 carried on the end of the arbor 139. The arbor is gripped by the chuck 52, and the vertical, transverse, and axial feeds are controlled in the same manner as previously described. Pins can be incorporated as shown at 140 and 141 to fix the position of the block 133 with respect to the jaws in a manner more positive than can be obtained by mere clamping action. In view of the fact that this mechanism is preferably a very low-cost device, it often results that the clamping surfaces of the jaws are not exactly parallel. The presence of the pins 140 and 141 provides for a secure positioning of the auxiliary clamp composed of the block 133 and the bar 134, and the pins are preferably in a press-fit engagement with the block 133, with a corresponding relatively looser slip fit in holes in the jaw 118. Alternatively, the pins 141 can be press-fit into the jaw 118 with looser engagement in the block 133, and with clearance holes opposite these pins in the upper jaw 117. In either case, the block 133 is engaged by opening the jaws 117 and 118 sufficiently to accommodate the width of the block plus the projection of the pins.

The height of the milling vise shown in FIGS. 1 through 9 is the principal element responsible for the offset formation of the arm 47 of the machine component 42. It is desirable that a considerable range of vertical movement be provided for blocks of material grasped between the jaws 117 and 118, in addition to the possible width of work pieces. Whatever the resulting height may be when the milling vise is designed to suit specific requirements, that height forms a design requirement between the top surface 60 of the carriage member 61 and the axis of rotation of the chuck 52.

It is often desirable to secure rods with the auxiliary clamping units shown in FIGS. 7 through 9 in an absolutely vertical position, and prevent slippage sideways under the forces generated by the cutting tool 138. A typical example of an operation where this would be required would be in slotting the end of a rod or screw head, which is an operation very commonly performed by model makers and workmen machining small parts. A rod or screw blank can be placed in one of the notches 142–144 in the block 133, and tightening of the screws 135 and 136 will hold the work piece rigidly in position. To give maximum freedom of vertical movement of the jaws 117 and 118, it is desirable to provide a clearance hole 145 in the base 113 to admit the lower end of the clamping screw 119. A similar hole may be placed in the top of the carriage 61. All of these structural features are designed in such a manner as to keep the forces generated during the machining operations in as compact a structure as possible to minimize bending deflection and vibration, and to facilitate die-casting procedures.

Figure 10:
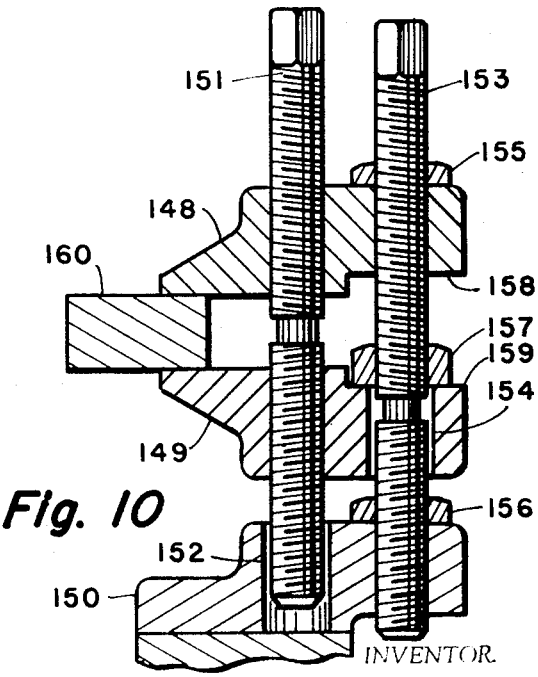
FIG. 10 is a sectional elevation showing a modified form of the invention.

In the modification illustrated in FIG. 10, the jaws 148 and 149 are slidably mounted on a pair of guide rods (not shown in FIG. 10) which are fixed with respect to the base 150, in the same manner as the structure previously described. The clamping screw 151 has threaded engagement of opposite hand with the jaws 148 and 149, respectively, and the lower extremity of this screw is accommodated in the clearance hole 152 in the base 150. The adjusting screw 153 has threaded engagement of opposite hand with the jaw 148 and with the base 150, respectively, and moves within the clearance hole 154 in the jaw 149. A pair of thin nuts 155 and 156 are engageable with the top surfaces of the jaw 148, and with the base 150, respectively, to remove all lost motion between the adjusting screw and these members.

The nut 157 provides a very significant feature. The jaws 148 and 149 are cut away at 158 and 159, respectively, to permit full closure of the jaws without interference from the presence of the nut 157. Tightening of the clamping screw 151 to create pressure on the work piece 160 will create a moment tending to rotate the jaw 148 in a clockwise direction, and the jaw 149 in a counterclockwise direction. This, of course, generates a binding action on the guide rods, which interferes with the movement of the jaws along the guide rods after the clamping pressure has been generated. This undesirable action can be opposed and balanced out by tightening the nut 157 downward against the jaw 149. Since the rate of movement of the jaw 148 is the same as that of the jaw 149 with respect to the base, on adjustment of the screw 153, the adjusted position of the nut 157 can remain during the manipulation of the screw 153. In other words, full clamping pressure can be generated against the work piece 160, the nut 157 tightened, and this clamped condition maintained as the screw 153 is adjusted to produce a vertical feed motion. Normally, the procedure for clamping the work piece 160 will be to generate very light clamping pressure with the clamping screw 151, followed by setting the nut 157 fairly tightly. This will produce a small but very significant degree of additional closure of the jaws 148 and 149 on the work piece 160, and will eliminate the binding action on the guide rods. When clamping adjustment with the screw 151 is to be made, the nut 157 is run upwards along the upper portion of the screw 153 into a position adjacent the jaw 148, until the desired pressure is obtained with the screw 151.

I claim:

1. In a milling vise having base mounted guide means, a mounting surface on said base and opposed jaw members slideably mounted on said guide means, the improvement comprising; means interconnecting said jaw members and base for selectively effecting a collective adjustment of said jaw members in one direction along said guide means for vertical adjustment and in opposite directions along said guide means for effecting clamping adjustment whereby both jaw clamping and jaw adjusting movement take place along the same guide means.

2. The milling vise of claim 1 wherein said means include screw means; said screw means comprising a clamping screw threadedly engaged with said opposed jaw members and an adjusting screw threadedly engaged with said base and one of said jaw members.

3. A milling vise as defined in claim 2, wherein said clamping screw has threaded engagement with said jaw members with threading of opposite hand, respectively.

4. A milling vise as defined in claim 2, wherein said adjusting screw has threaded engagement with saw jaw member and base with threading of opposite hand, respectively.

5. A milling vise as defined in claim 2, wherein said base has a clearance hole disposed to receive the end of said clamping screw.

6. A milling vise as defined in claim 2, wherein said jaw members are disposed in a space defined by the periphery of said base projected perpendicularly thereto.

7. A milling vise as defined in claim 2, wherein said mounting surface normally engages the top of a supporting member, and said adjusting screw engages an overhanging portion of said base extending laterally beyond said supporting member for clearance of said adjusting screw.

8. A milling vise having a base with a mounting surface and provided with guide means, and also having opposite jaw members slideably mounted with respect to said guide means, wherein the improvement comprises: a clamping screw engaging said jaw members, exclusively, to generate clamping forces therebetween; and an adjusting screw having engagement with only one of said jaw members and with said base, said jaw members both being slideably mounted on the same guide means and wherein said guide means is in the form of at least two parallel rods, and said jaw members have gripping surfaces on the opposite side of said rods from said adjusting screw, and said device additionally includes nut means on said adjusting screw disposed to bear on the jaw member other than that in which said adjusting screw has threaded engagement in a direction to balance the moment induced by pressures of said gripping surfaces about the points of engagement of said clamping screw with said jaw members.

9. The milling vise of claim 1 including an adapter including a block receivable between said jaws; and a holding bar adjustably secured to said block for adjustment in a direction parallel to the plane of separation of said jaws to establish a clamping action in a direction transverse to the clamping action of said jaws.

10. A milling vise including a pair of jaws moveably mounted on guideway means, and a clamping screw engaging said jaws, and also including positioning means for locating said jaws along said guideway means, wherein the improvement comprises: an adapter including a block receivable between said jaws, and a holding bar adjustably secured to said block for adjustment in a direction parallel to the plane of separation of said jaws to establish a clamping action in a direction transverse to the clamping action of said jaws and wherein said block and at least one of said jaws are normally interengaged with locking means separable in a direction parallel to said guideway means to fix said base against lateral displacement or rotation with respect to said jaws.

* * * * *